US010314241B1

(12) United States Patent
Dunn

(10) Patent No.: US 10,314,241 B1
(45) Date of Patent: Jun. 11, 2019

(54) AIRBORNE VEGETATION CUTTING ASSEMBLY

(71) Applicant: T. Scott Dunn, Phoenix, OR (US)

(72) Inventor: T. Scott Dunn, Phoenix, OR (US)

(*) Notice: Subject to any disclaimer, the term of this patent is extended or adjusted under 35 U.S.C. 154(b) by 183 days.

(21) Appl. No.: 15/370,946

(22) Filed: Dec. 6, 2016

Related U.S. Application Data

(60) Provisional application No. 62/394,465, filed on Sep. 14, 2016.

(51) Int. Cl.
| A01G 3/08 | (2006.01) |
| B64D 47/00 | (2006.01) |
| A01G 23/095 | (2006.01) |
| A01G 23/08 | (2006.01) |

(52) U.S. Cl.
CPC ............ *A01G 3/086* (2013.01); *A01G 23/08* (2013.01); *A01G 23/095* (2013.01); *B64D 47/00* (2013.01)

(58) Field of Classification Search
CPC .... A01G 23/08; A01G 23/081; A01G 23/083; A01G 23/091; A01G 23/093; A01G 23/095; A01G 3/08; A01G 3/085; A01G 3/086; A01G 3/088
See application file for complete search history.

(56) References Cited

U.S. PATENT DOCUMENTS

| 3,266,633 A | 8/1966 | Graebner |
| 3,566,526 A | 3/1971 | La Violette |
| 3,746,177 A | 7/1973 | Vilotti |
| 4,551,791 A | 11/1985 | Rogers |
| 4,815,263 A | 3/1989 | Hartung |
| 4,936,038 A | 6/1990 | Johnson et al. |
| 4,987,935 A * | 1/1991 | Corcoran ............ A01G 23/091 144/241 |
| D346,950 S | 5/1994 | Dunn et al. |
| D359,441 S | 6/1995 | Miller |
| 5,908,060 A * | 6/1999 | Fargeot ............... A01G 23/083 144/24.13 |
| 5,937,559 A | 8/1999 | Jennen |
| 6,263,932 B1 * | 7/2001 | Chalifoux ............ A01G 23/08 144/24.13 |
| D449,977 S | 11/2001 | Dembowiak et al. |
| 6,408,906 B1 | 6/2002 | Moon |

(Continued)

*Primary Examiner* — Matthew Katcoff
(74) *Attorney, Agent, or Firm* — Jerry Haynes Law

(57) ABSTRACT

An airborne vegetation cutting assembly aerially suspended by an aircraft to simultaneously grapple and trim vegetation across a cutting plane that can be rotated and pivoted at multiple cutting angles. The assembly comprises a housing that contains the hydraulic mechanism and a power portion for operating the components. A tube extends from the aircraft to the housing. A knuckle detachably attaches the housing to the tube. Upper and lower grappling devices extend from the housing in a coplanar, spaced-apart relationship. The grappling devices grapple and release the vegetation independently of each other. A blade is coplanar with the grappling devices. The blade cuts a cross section of the vegetation along a cutting plane after the grappling devices grapple the vegetation. A connective knuckle rotates and pivots to enable rotational and pivotal control of the grappling devices and the blade, so as to change the orientation of the cutting plane.

20 Claims, 6 Drawing Sheets

(56) References Cited

U.S. PATENT DOCUMENTS

| | | | |
|---|---|---|---|
| 6,418,989 B1 * | 7/2002 | Jarman | A01G 23/08 144/336 |
| 6,425,560 B1 | 7/2002 | Dembowiak et al. | |
| 6,491,271 B1 | 12/2002 | Adams | |
| 6,793,184 B2 | 9/2004 | Dougal et al. | |
| 6,814,112 B2 * | 11/2004 | Johansson | A01G 23/083 144/338 |
| 7,963,406 B2 | 6/2011 | Kinsella | |
| 9,403,747 B2 * | 8/2016 | Liu | A61K 9/0056 |
| 9,456,559 B2 | 10/2016 | Dunn | |
| 9,591,810 B2 * | 3/2017 | Bisballe | A01G 23/083 |
| 9,795,091 B2 * | 10/2017 | Lindbom | A01G 23/091 |
| 2003/0159757 A1 | 8/2003 | Tingstad | |
| 2008/0105322 A1 | 5/2008 | Lippits | |
| 2009/0000698 A1 * | 1/2009 | Beresford | A01G 23/08 144/336 |
| 2010/0230008 A1 * | 9/2010 | Kondo | A01G 23/083 144/338 |
| 2014/0069554 A1 * | 3/2014 | Raszga | A01G 23/083 144/336 |
| 2015/0144225 A1 * | 5/2015 | Stulen | B27L 1/005 144/208.91 |
| 2017/0020085 A1 * | 1/2017 | Boys | A01G 23/083 |

* cited by examiner

AIRBORNE VEGETATION CUTTING ASSEMBLY

CROSS REFERENCE OF RELATED APPLICATIONS

This application claims the benefits of U.S. provisional application No. 62/394,465, filed Sep. 14, 2016 and entitled AIRBORNE VEGETATION TRIMMING APPARATUS, which provisional application is incorporated by reference herein in its entirety.

FIELD OF THE INVENTION

The present invention relates generally to an airborne vegetation cutting assembly that is mobilized by an aircraft to simultaneously grapple and trim vegetation at multiple cutting angles. More so, the present invention relates to an airborne vegetation cutting assembly that trims, or lops a top section off a tree, while being suspended from an aircraft; whereby a tube connects the aircraft to the assembly; whereby a rotating and pivoting knuckle detachably attaches the tube to a housing; whereby at least one upper and lower grappling device, and a blade are disposed in a coplanar, spaced-apart relationship, and configured to simultaneously grapple, release, and cut the vegetation along a cutting plane; and whereby the cutting plane is adjustable by manipulating rotation and pivoting of the housing in relation to the vegetation, so as to create a desired trimming angle.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Generally, a chainsaw is a portable, mechanical saw which cuts with a set of teeth attached to a rotating chain that runs along a guide bar. It is used in activities such as tree felling, limbing, bucking, pruning, cutting firebreaks in wildland fire suppression, and harvesting of firewood. The use of hand operated chain saws or saws manipulated by heavy machinery are commonly used. Both of these typical methods of cutting down trees requires access to the base of the tree. In the case of a heavy machine, such as, for example an excavator with a feller buncher head attached to the distal end of the arm requires a significant amount of free space adjacent to the base of the tree so that the excavator may access the tree.

It is known that when tall trees die through bushfire, flood or disease they become particularly dangerous. Where trees are located near powerlines, it becomes extremely difficult, if not impossible, to cut the tree down from the ground. Land areas in the vicinity of power lines must be kept free of trees, as it is thus possible to prevent line damage caused by trees that might touch the electricity wires and disturbances in power distribution caused thereby. Often, where growing trees have been inappropriately planted or naturally occur near powerlines, there is an increasing need to frequently trim and cut back those trees to ensure that they do not impede the powerlines.

Often, access to the base of a tree is not always available or practical. In the case of trees located on high or steep mountain sides, road access may not be available. In addition, in the case of thick forests where only a single tree is desired to be cut down, previous methods have required having a worker either walk to the location or be lowered to the ground from a helicopter proximate to the target tree.

Other proposals have involved cutting trees from the air. The problem with these tree cutting devices is that they do not provide an adjustable and controlled cutting plane for the blade, and they are not compactable adaptable to a variety of aircraft. Even though the above cited tree cutting devices meet some of the needs of the market, an airborne vegetation cutting assembly that is aerially suspended by an aircraft to simultaneously grapple, cut, and trim a vegetation, while controlling the angle of a cutting plane across the vegetation through controlled rotation and pivoting of a connective knuckle, and strategic positioning of the aircraft is still desired.

SUMMARY

Illustrative embodiments of the disclosure are generally directed to an airborne vegetation cutting assembly. The airborne vegetation cutting assembly is aerially suspended by an aircraft to simultaneously grapple, cut, and trim a vegetation, while controlling the angle of a cutting plane across the vegetation through controlled rotation and pivoting of a connective knuckle, and strategic positioning of the aircraft. The assembly trims, or lops a top section off a tree, while being suspended from the aircraft. The assembly comprises a housing that contains the hydraulic mechanism and a power portion for operating the components. A tube extends from the aircraft to the housing. A rotatable and pivotable knuckle detachably attaches the housing to the tube.

At least one upper grappling device and at least one lower grappling device extend from the housing in a coplanar, spaced-apart relationship. The grappling devices are operable to grapple and release the vegetation independently of each other. A rotating blade is disposed coplanar with, and between the upper and lower grappling devices. The blade cuts a cross section of the vegetation after the grappling devices have grappled the vegetation, generally along a cutting plane that cuts across a longitudinal axis of the vegetation. The knuckle rotates and pivots to enable rotational and pivotal control of the grappling devices and the blade, so as to change the orientation of the cutting plane across the vegetation.

In some embodiments, the assembly may include a housing defined by a plurality of sidewalls, an upper wall forming an opening, and a lower wall. At least one of the sidewalls defined by an upper grappler slot, a lower grappler slot, and a blade slot, the slots disposed in a generally coplanar, spaced-apart relationship.

The assembly may also include a tube defined by a tube aircraft end and a tube housing end. The tube housing end operatively joins with the upper wall of the housing. The tube aircraft end operatively joins with the aircraft. In one possible embodiment, the tube carries wiring, or hydraulic fluid, or both. Though in other embodiments, the tube does not carry wiring or hydraulic fluid.

The assembly may also include at least one upper grappling device configured to extend through the upper grappler slot. The upper grappling device is configured to articulate between a grappling position and a release position. An upper piston displaces the upper grappling device between the grappling position and the release position.

The assembly may also include at least one lower grappling device configured to extend through the lower grappler slot. The lower grappling device is configured to articulate between the grappling position and the release position. A lower piston displaces the lower grappling device between the grappling position and the release position. The upper grappling device and the lower grappling device are configured to grapple and release independently of each other.

The assembly may also include a rotating blade configured to extend and retract through the blade slot. The rotating blade is disposed in a coplanar relationship with, and between the upper and lower grappling devices. The rotating blade rotates along a cutting plane to cut across a longitudinal axis of the vegetation.

The assembly may also include a knuckle disposed between the sidewall of the housing and the tube. The knuckle serves to detachably attach the plurality of sidewalls of the housing and the tube housing end of the tube. The knuckle has freedom to rotationally and pivotally move while coupled to the upper wall. The knuckle is configured to rotate and pivot relative to the tube. In this manner, rotation and pivoting by the knuckle enables adjustable orientation of the cutting plane and position of the grappling devices.

The assembly may also include a hydraulic mechanism operatively connected to the wiring or the hydraulic fluid. The hydraulic mechanism may include a hydraulic pump, a hydraulic fluid reservoir, and a hydraulic controller. The hydraulic mechanism is configured to controllably actuate the upper grappling device, or the lower grappling device, or both, between the grappling position and the release position.

The hydraulic mechanism is further configured to controllably actuate retraction and extension of the rotating blade. The hydraulic mechanism is further configured to controllably actuate rotation of the rotating blade. In this manner, the position and the rotations per minute of the blade may be controlled. The hydraulic mechanism further configured to controllably actuate rotation of the knuckle for rotational control of the housing. The hydraulic mechanism is further configured to controllably actuate pivoting of the knuckle for pivotal control of the housing.

One objective of the present invention is to trim and cut vegetation from an overhead position.

Another objective is to utilize an aircraft to cut and trim the vegetation.

Yet another objective is to provide a tree trimming assembly that can be operated from the aircraft while airborne.

Another objective is to carry the trimming assembly for operation with a helicopter.

Another objective is to grapple a tree with multiple, spaced-apart grappling devices while trimming a cross section of a longitudinal axis of the tree with a rotating blade.

Another objective is to pivot the cutting plane by engaging either grappling device with the vegetation.

Yet another objective is to control the grappling devices and the rotating blade from the aircraft or from a remote location.

Yet another objective is to provide a portable trimming assembly that trims the top section of trees to minimize impedance to power lines, and to reduce brush fires.

Yet another objective is to remotely control the assembly from an aircraft.

Yet another objective is to provide an efficient and cost effective means to trim and cut trees in a heavily tree populated area.

Other systems, devices, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims and drawings.

DETAILED DESCRIPTION OF THE DRAWINGS

The invention will now be described, by way of example, with reference to the accompanying drawings, in which.

Like reference numerals refer to like parts throughout the various views of the drawings.

DETAILED DESCRIPTION OF THE INVENTION

Figure 1:
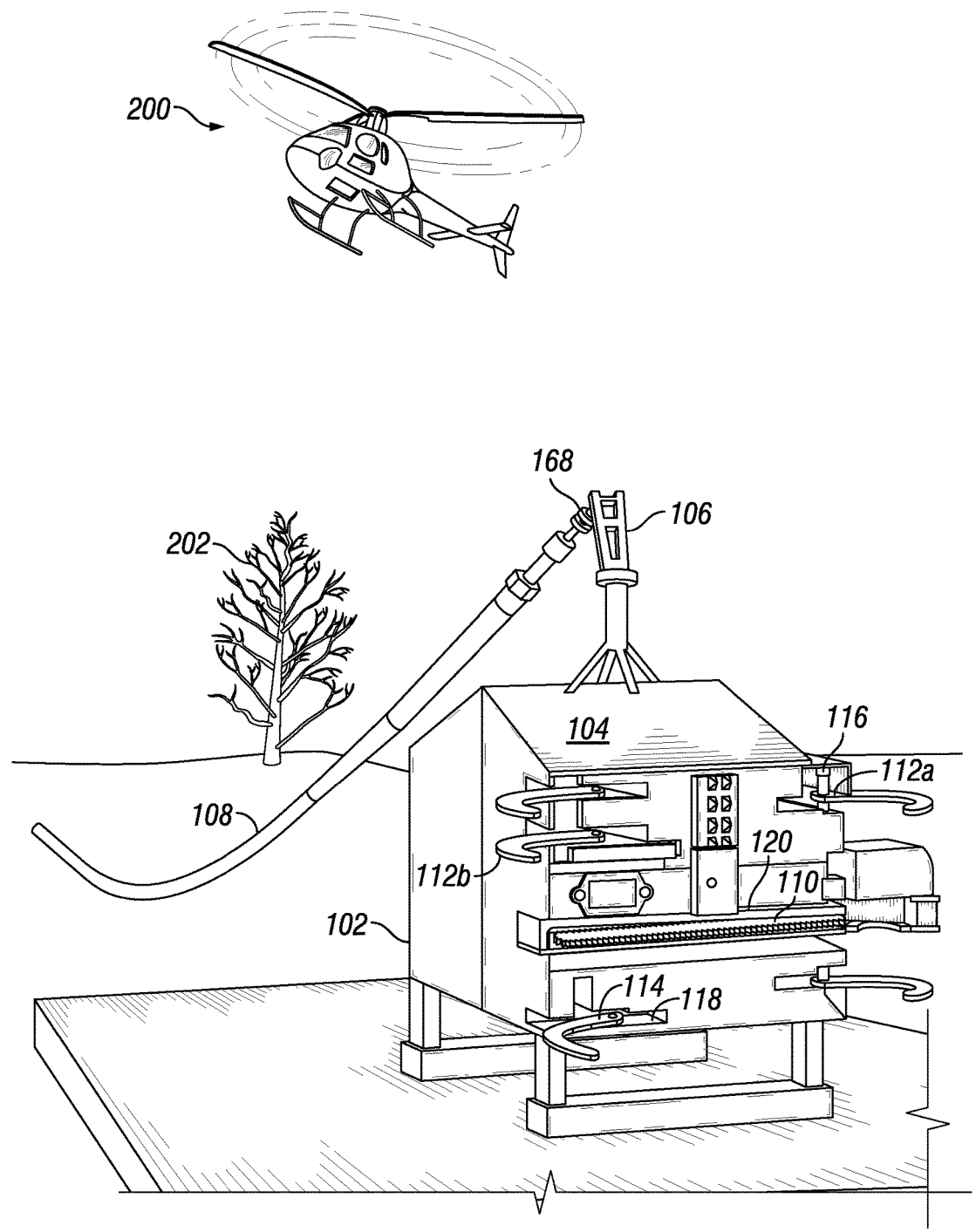
FIG. 1 illustrates a perspective view of an exemplary airborne vegetation cutting assembly operational with an aircraft, in accordance with an embodiment of the present invention.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Specific dimensions and other physical characteristics relating to the embodiments disclosed herein are therefore not to be considered as limiting, unless the claims expressly state otherwise.

An airborne vegetation cutting assembly 100 is referenced in FIGS. 1-6. The airborne vegetation cutting assembly 100, hereafter "assembly 100" provides a unique tree trimming tool that is aerially suspended by an aircraft 200 to simultaneously grapple, cut, and trim a vegetation 202, while controlling the angle of a cutting plane 156 across the vegetation through controlled rotation and pivoting of a connective knuckle 106, and strategic positioning of the aircraft 200.

The assembly 100 provides at least one upper grappling device 112a, 112b and at least one lower grappling device 114a, 114b that work independently of each other to grapple the vegetation while a rotating blade 110 cuts through the vegetation across a cutting plane 156. The angle of the grappling devices 112a-b, 114a-b and the cutting plane 156 may be rotatably and pivotally adjusted through control of a rotating and pivoting knuckle 106, and also strategic manipulation of the aircraft 200. This flexible positioning of grappling devices 112a-b, 114a-b and the blade 110 help to achieve a desired grappling orientation and cutting angle across the longitudinal axis of the vegetation 202. For example, a horizontal cutting plane, or a 20° cutting plane may be achieved.

Those skilled in the art will recognize that when tall trees die through bushfire, flood or disease they become particularly dangerous. Where trees are located near powerlines, it becomes extremely difficult, if not impossible, to cut the tree down from the ground. Similarly, where growing trees have been inappropriately planted or naturally occur near powerlines, there is an increasing need to frequently trim and cut back those trees to ensure that they do not impede the powerlines. Additionally, the base of a tree may be difficult to access in a full forest or hilly terrain. Thus, aerial cutting of trees may be necessary.

In one embodiment, the assembly 100 works to trim, or lop, a top section from a tree while being suspended and positioned from the aircraft 200. The aircraft 200 is a generally a hovering type of rotary aircraft, such as a helicopter, that can remain substantially stationary and reorient to different grappling and cutting angles while grappling and cutting the vegetation 202. The vegetation 202 may include, without limitation, a tree, a trunk, a stem, a branch, a bush, and a plant having a generally linear longitudinal axis.

In one exemplary use of the assembly 100, the aircraft 200 aligns the upper and lower grappling devices 112a-b, 114a-b with the longitudinal axis of the vegetation and then moves the blade 110 towards and away from the vegetation 202 to cut desired sections of the vegetation. The upper and lower grappling devices 112a, 112b, 114a, 114b and the blade 110 are also controlled from the aircraft 200. The aircraft 200 may remotely control the assembly 100 through radio frequencies known in the art. Though in one alternative embodiment, wiring through the tube may carry the signals for control of components of the assembly 100.

FIG. 1 illustrates an exemplary airborne vegetation cutting assembly 100 operational with an aircraft 200. The assembly 100 may include a housing 102 that contains and protects the components of the assembly 100. Housing 102 also provides wiring and hydraulic fluid to enable operative connectivity with the aircraft 200. In some embodiments, the housing 102 may be defined by a plurality of sidewalls 104, an upper wall 122 forming an opening 126, and a lower wall 124. A cavity 128 forms inside the sidewalls 104, upper wall 122, and lower wall 124. The sidewalls 104, upper wall 122, and lower wall 124 may form a generally cubicle or rectangular shape. Though in other embodiments, other shapes may be formed.

In some embodiments, at least one face of the sidewalls 104 comprises an upper grappler slot 116, a lower grappler slot 118, and a blade slot 120. The slots 116, 118, 120 are disposed in a generally coplanar, spaced-apart relationship. In one embodiment, the blade slot 120 is disposed between the upper and lower grappler slots 116, 118. The slots 116, 118, 120 may be configured in any shape or dimension to enable extension and retraction of the respective components through the slots. Suitable materials for the housing 102 may include, without limitation, steel, iron, titanium, metal alloys, and a rigid polymer.

Figure 2:
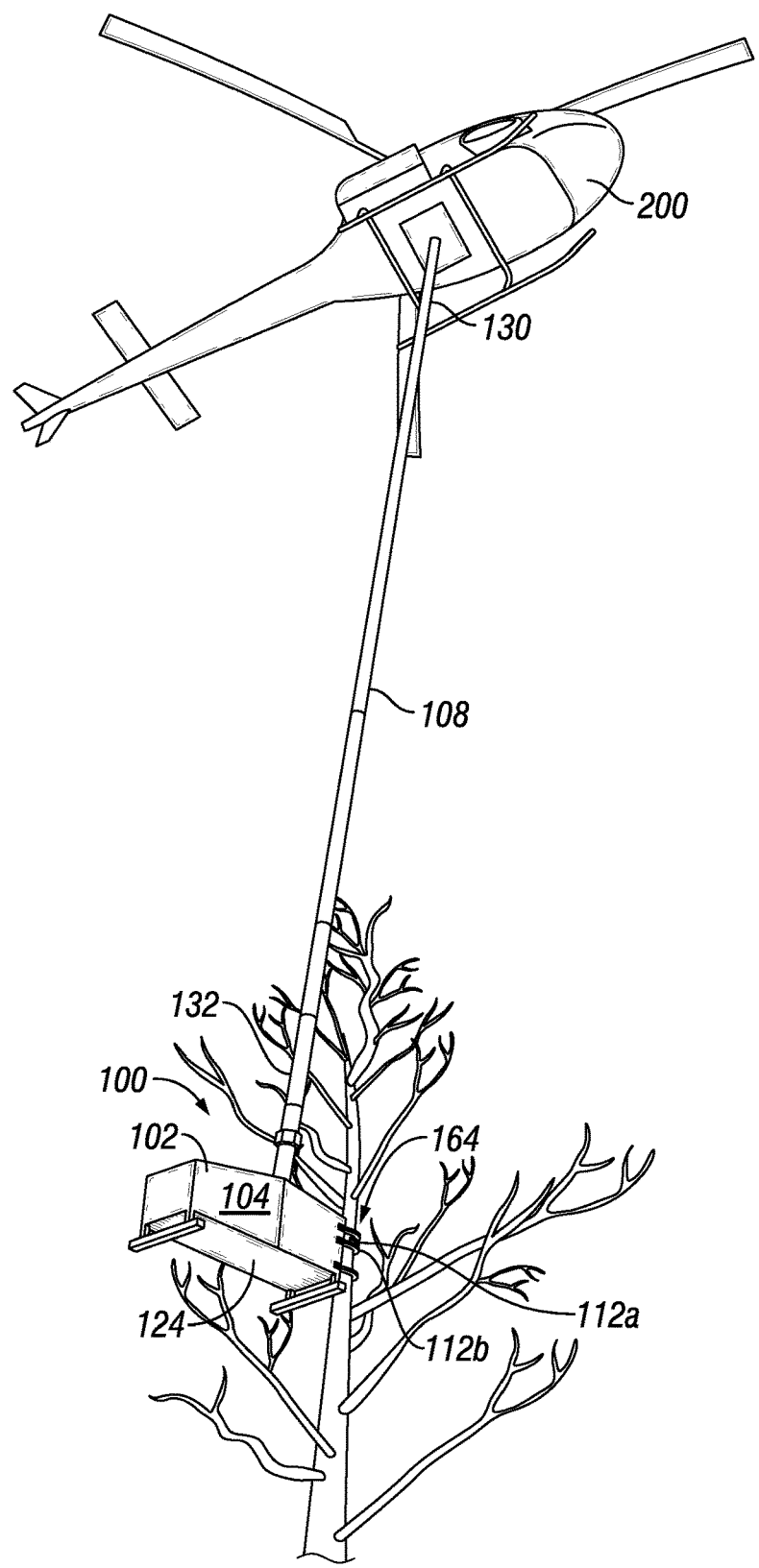
FIG. 2 illustrates a perspective view of an aircraft positioning an airborne vegetation cutting assembly along the longitudinal axis of a vegetation and an upper and lower grappling device in a release position, in accordance with an embodiment of the present invention.

Turning now to FIG. 2, a tube 108 extends between from the aircraft 200 and the housing 102. The tube 108 is defined by a tube aircraft end 130 and a tube housing end 132. The tube housing end 132 operatively joins with the upper wall 122 of the housing and is in communication with the cavity 128 of the housing 102 through the opening 126 in the upper wall 122. The tube aircraft end 130 operatively joins with the aircraft.

In one embodiment, the tube 108 supports the weight of the housing 102, the upper grappling device 112a, 112b, the lower grappling device 114a, 114b, the rotating blade 110, and additional components in the housing 102, discussed below. In one embodiment, the tube 108 may also serve to carry wiring, or hydraulic fluid, or both to enable operational communication with a hydraulic mechanism 138 and a power portion 146 in the housing 102. The wiring and hydraulic fluid enable operation of the grappling articulations and rotation of the blade 110. In this manner, operation of the assembly 100 may be remotely controlled from the aircraft 200.

The assembly 100 may also include at least one upper grappling device 112a-b configured to extend through the upper grappler slot 116. The upper grappling device 112a-b is configured to articulate between a grappling position 162 that retains the vegetation (FIG. 3), and a release position 164 that releases the vegetation (FIG. 2). In one embodiment, an upper piston 134 displaces the upper grappling device between the grappling position 162 and the release position 164. The upper piston 134 may be hydraulically operated. Though in alternative embodiments, the upper piston 134 may be electrically controlled and actuated.

Figure 4:
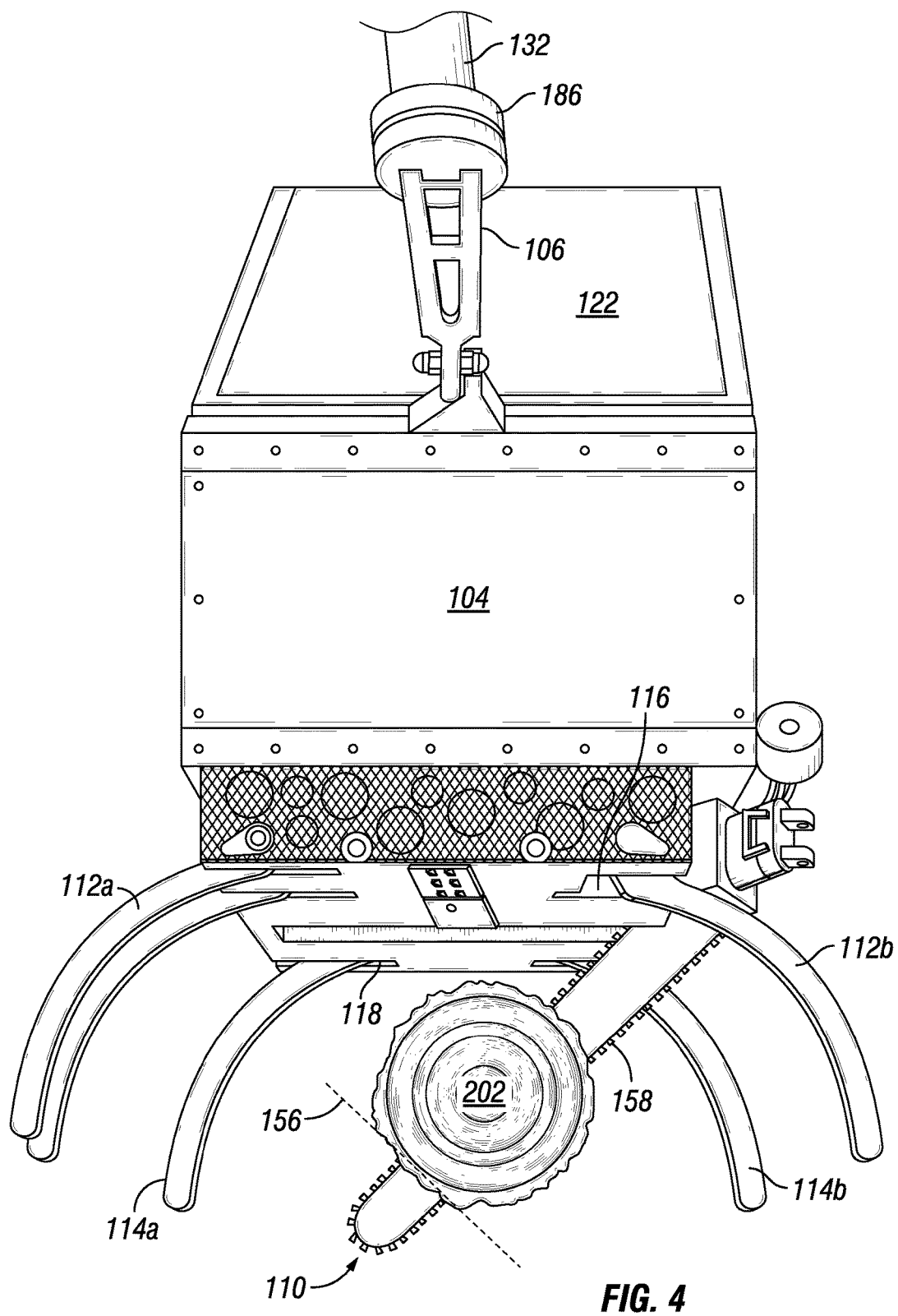
FIG. 4 illustrates a top view of an airborne vegetation cutting assembly with a blade cutting vegetation along a cutting plane, in accordance with an embodiment of the present invention.

Turning now to FIG. 4, the upper grappling device 112a, 112b includes a pair of arms having a curved disposition that enables partial encirclement of a tree trunk. The arms may pivot outwardly and inwardly to adjust to various diameters of the tree trunk. The at least one upper grappling device 112a, 112b is configured to articulate between a grappling position 162 and a release position 164. In the grappling position 162, the arms move together to grapple the tree trunk. In the release position 164, the arms separate to disengage from the tree trunk. In one embodiment, the upper grappling device 112a, 112b comprises two upper grappling devices 112a, 112b disposed in a coplanar, spaced-apart relationship.

The assembly 100 may also include at least one lower grappling device 114a, 114b configured to extend through the lower grappler slot. The lower grappling device is configured to articulate between the grappling position 162 and the release position 164. A lower piston 136 displaces the lower grappling device between the grappling position 162 and the release position 164. The upper grappling device and the lower grappling device are configured to grapple and release independently of each other.

In one embodiment, the lower grappling device 114a, 114b may include a pair of arms having a curved disposition that enables partial encapsulation of a tree trunk. The lower arms may pivot outwardly and inwardly to adjust to various diameters of the tree trunk. The lower grappling device 114a, 114b is configured to articulate between a grappling position 162 and a release position 164 independently of the upper grappling device 112a, 112b.

In the grappling position 162, the lower arms move together to grapple the tree trunk. In the release position 164, the lower arms separate to disengage from the tree trunk. Because of its position relative to the upper grappling device 112a, 112b, the lower grappling device 114a, 114b generally grapples a larger diameter section of the tree trunk than the upper grappling device 112a, 112b.

Figure 5:
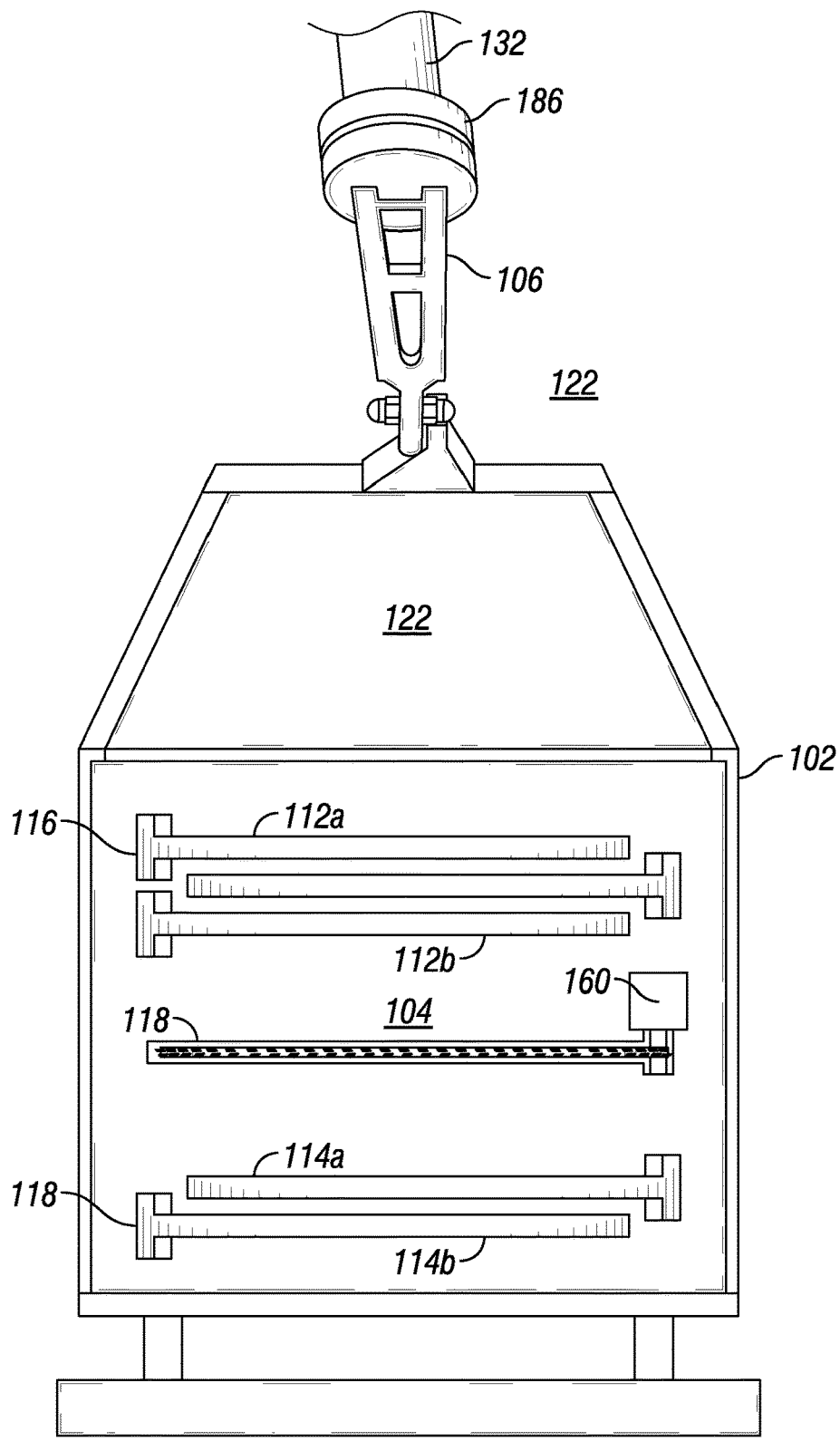
FIG. 5 illustrates a front view of an airborne vegetation cutting assembly, in accordance with an embodiment of the present invention.

As referenced in FIG. 5, the assembly 100 may also include a rotating blade 110 configured to extend and retract through the blade slot 120. The rotating blade 110 is disposed in a coplanar relationship with, and between the upper and lower grappling devices. As illustrated in FIG. 4, the blade 110 rotates along a cutting plane 156 to cut across a longitudinal axis of the vegetation. The retraction and extension of the rotating blade 110 while rotating helps to create a clean, smooth cut across the longitudinal axis of the vegetation 202.

In one embodiment, the blade 110 is elongated and has a serrated edge 158 sufficiently sharp for cutting through bark and vegetative fibers. The blade rotates at an adjustable rotations per minute, dependent on the type of vegetation being cut. A blade motor 160 may power rotation of the blade 110.

The rotating blade 110 may be tilted to a desired cutting angle by engaging only one of the grappling devices 114a, 114b with the vegetation 202 and then pivoting the rotating blade 110 about the section of the vegetation 202 that is engaged. Further, by positioning the rotating blade 110 between the upper and lower grappling devices 112a, 112b, 114a, 114b, alignment with the longitudinal axis of the vegetation 202, and stability is enhanced during trimming.

The assembly 100 may also include a knuckle 106 disposed between the sidewall of the housing and the tube. The knuckle 106 serves to detachably attach the plurality of sidewalls 104 of the housing and the tube housing end 132 of the tube 108. The knuckle 106 is configured to detachably couple with the opening 126 in the upper wall 122. This may include a friction fit relationship or a fastener, such as a bolt, may couple the two components together.

In one embodiment, a rotator 168 operatively attached adjacent to knuckle 106 enables rotation, or pivoting, or both by the knuckle 106. In this manner, the knuckle 106 has freedom to rotationally and pivotally move while coupled to the upper wall 122. In this manner, knuckle 106 may rotate and pivot relative to the tube. In this manner, rotation and pivoting by the knuckle 106 enables adjustable orientation of the cutting plane 156 by the blade 100 and the positioning of the grappling devices 112a-b, 114a-b. In one embodiment, hydraulic pressure controls the rotation of the knuckle 106. For example, a pair of hydraulic hoses attach to the knuckle 106 from opposing directions to rotate the knuckle 106 in the desired direction. The pivoting motion may also be controlled through similar hydraulic means. Though in alternative embodiments, electrical power may be used to control the rotation and pivoting of the knuckle 106.

Figure 6:
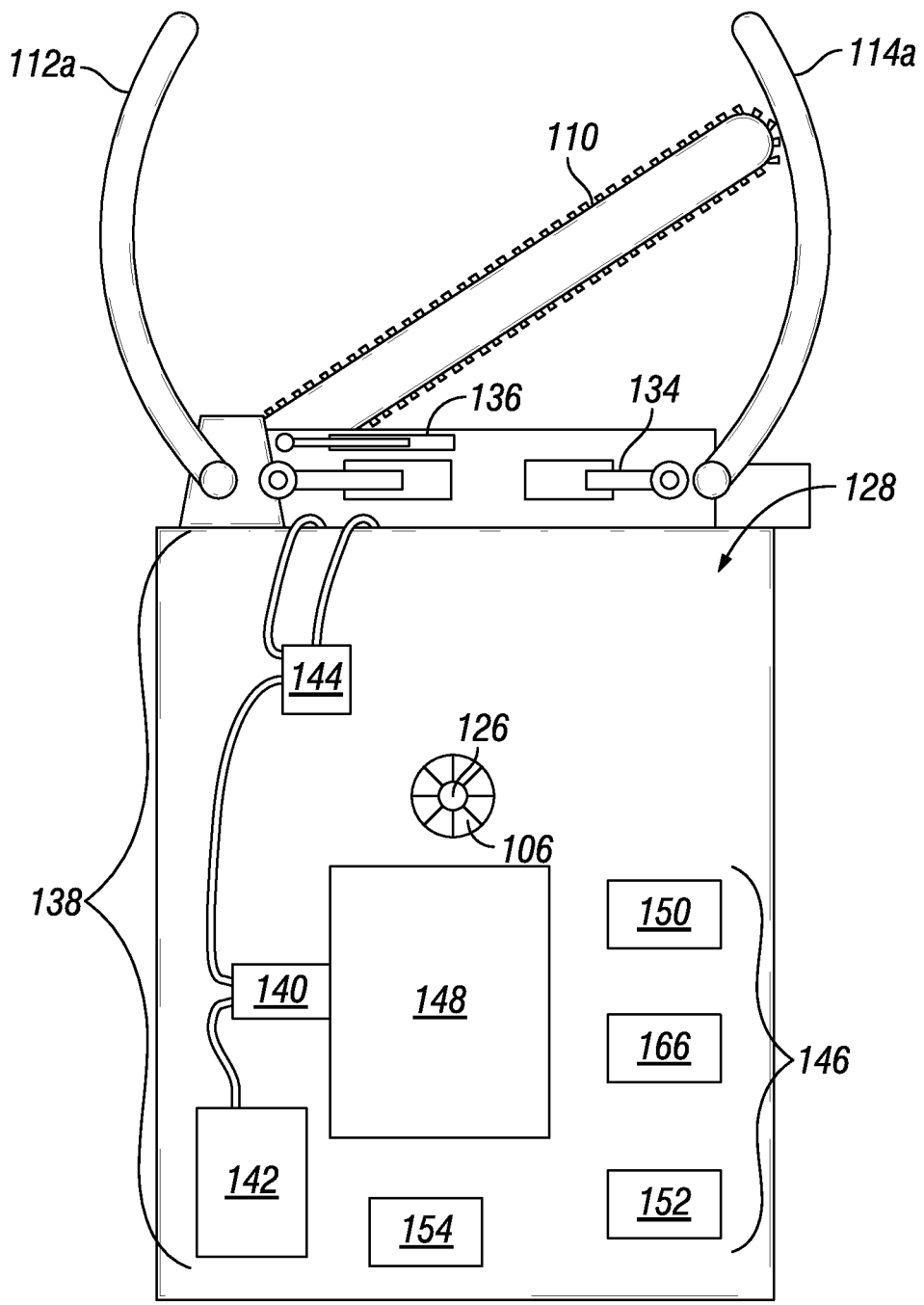
FIG. 6 illustrates a sectioned view of an airborne vegetation cutting assembly showing a hydraulic mechanism and a power portion, in accordance with an embodiment of the present invention.

Looking now at FIG. 6, the assembly 100 may also include a hydraulic mechanism 138 for actuating components of the assembly 100. The hydraulic mechanism 138 is operatively connected to the wiring or the hydraulic fluid. Specifically, the hydraulic mechanism 138 is configured to controllably actuate the upper grappling device, or the lower grappling device, or both, between the grappling position 162 and the release position 164. The opening 126 in the upper wall 122 of the housing 102 enables communication between the hydraulic fluid in the tube 108 and the hydraulic mechanism 138.

In some embodiments, the hydraulic mechanism 138 may include: a hydraulic fluid reservoir 142 for storing hydraulic fluid; a hydraulic pump 140 for pumping the hydraulic fluid to the upper and lower piston 136; and a hydraulic controller 144 for regulating power and pressure of hydraulic fluid. The hydraulic controller may be controlled remotely from the aircraft.

The hydraulic mechanism 138 also controls actuate retraction and extension of the blade 110, and rotation of the blade 110. In this manner, the position and the rotations per minute of the blade 110 may be controlled. The hydraulic mechanism 138 is also configured to controllably actuate rotation of the knuckle 106 for rotational control of the housing 102. The hydraulic mechanism 138 is further configured to controllably actuate pivoting of the knuckle 106 for pivotal control of the housing 102.

The assembly 100 may further include a power portion 146 that is operable in the cavity 128 of the housing. The power portion 146 helps power the hydraulic mechanism 138 and provides other ancillary electrical functions, such as lighting and radio reception for remote operation of the hydraulic mechanism 138. In some embodiments, the power portion 146 may include: an engine 148, a battery 150 for powering electrical components, a fuel tank 152 for fueling the engine, a radio controller 166 for communicating with the aircraft 200, and a light emitting diode 154 for providing lighting. The opening 126 in the upper wall 122 of the housing 102 enables communication between the wiring and the power portion 146.

As discussed above, the rotating blade 110 rotates along a cutting plane 156 to trim the vegetation 202. The cutting plane 156 is not always horizontal to the grappling devices. The cutting plane 156 may also be forcibly tilted slightly above or below the plane of the grappling devices 112a, 112b, 114a, 114b. As the knuckle rotates or pivots, the housing 102 pivots about the upper or lower grappling devices 112a, 112b, 114a, 114b when engaged with the vegetation to achieve the desired angle of the cutting plane 156 for the rotating blade 110. For example, FIG. 4 illustrates a blade passing through a tree trunk at a horizontal 90° cutting plane.

In one exemplary manipulation of grappling devices 112a-b, 114a-b and housing 102 to achieve a desired cutting plane 156, the housing 102 pivots about the upper grappling device 112a, 112b while grappling the vegetation 202. The lower grappling device 114a, 114b remains disengaged from the vegetation causes the rotating blade 110 to pivot at a downward slope. Conversely, pivoting the housing 102 about the lower grappling device 114a, 114b while grappling the vegetation 202, and while the upper grappling device 112a, 112b is disengaged from the vegetation causes the rotating blade 110 to pivot at a downward slope. When both grappling devices 112a, 112b, 114a, 114b are grappling the vegetation 202, however, the cutting plane 156 of the rotating blade 110 is disposed generally horizontal with the grappling devices 112a, 112b, 114a, 114b.

Figure 3:
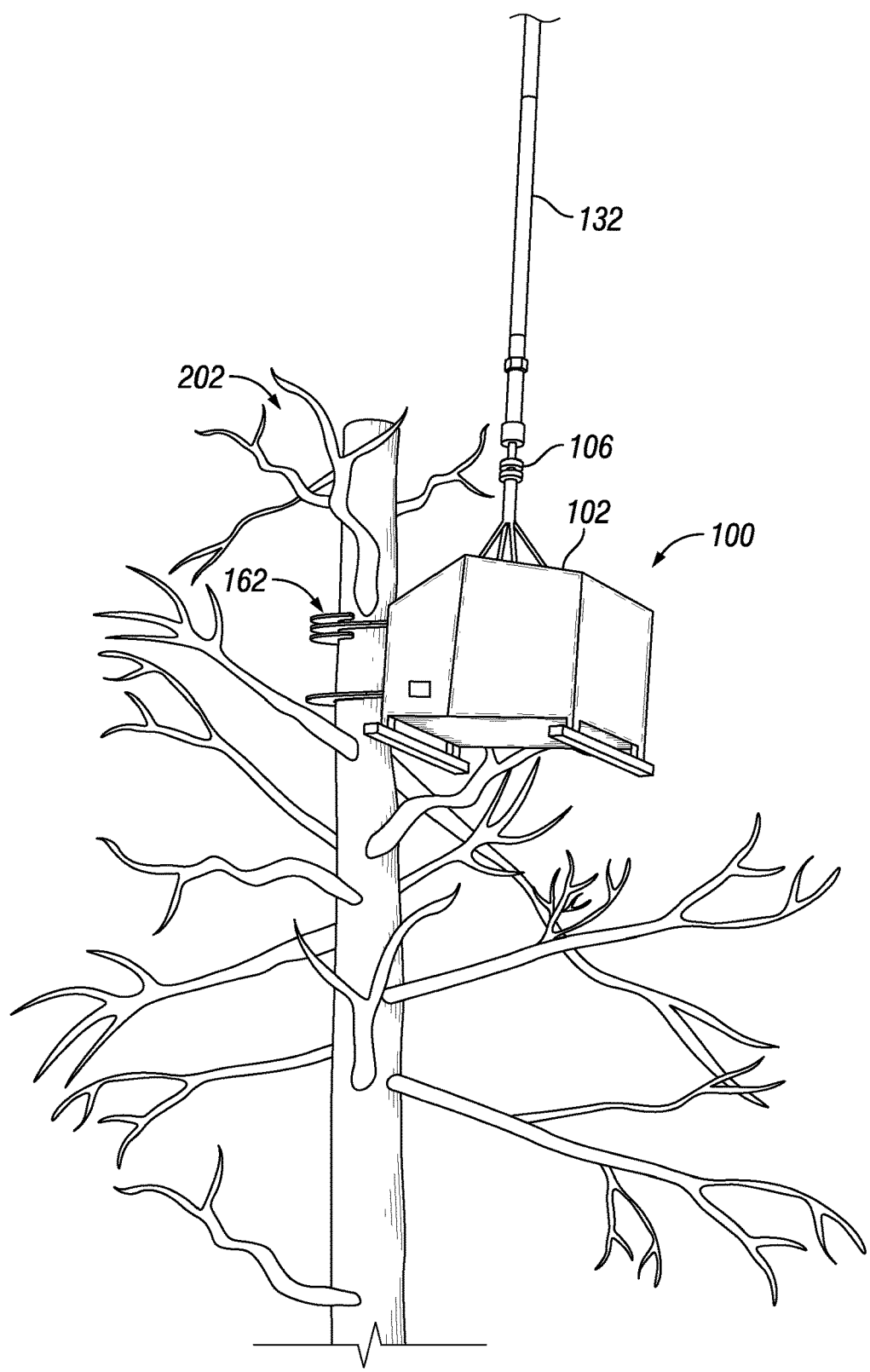
FIG. 3 illustrates a perspective view of an aircraft positioning an airborne vegetation cutting assembly along the longitudinal axis of a vegetation and an upper and lower grappling device in a grappling position, in accordance with an embodiment of the present invention.

In operation as shown in FIGS. 2 and 3, a tube 108 extends between the assembly 100 and an aircraft 200. The aircraft 200 securely attaches to a tube aircraft end 130 through various fastening mechanisms. The aircraft 200 may include a hydraulic fluid reservoir to store and dispense hydraulic fluid through the tube 108. The aircraft 200 may also include a generator to produce electricity for the wiring. The tube aircraft end 130 may then detachably attach to the knuckle 106 by coupling near the opening 126 in the upper wall 122. This coupling enables communication of electricity and hydraulic fluid with the hydraulic mechanism 138 and the power portion 146.

The upper and lower grappling devices 112a-b, 114a-b are positioned along a longitudinal axis of the vegetation 202 through positioning of the aircraft 200. The grappling devices 112a-b, 114a-b are then actuated to close inwardly around the vegetation 202, so as to partially grapple, or forcible encircle the vegetation 202. It is significant to note that the curved disposition of the grappling devices 112a, 112b, 114a, 114b are effective for secure grappling of a cylindrical shape, such as a tree trunk. The upper or lower or both grappling devices 112a, 112b, 114a, 114b are actuated to articulate to the grappling position 162 around the vegetation 202.

After achieving a desired grappling position, the blade 110 is hydraulically actuated to extend from the blade slot 120 and rotate. The angle of the cutting plane 156 may be adjusted by adjusting the rotation or pivot of the knuckle, or by releasing either grappling device 112a, 112b, 114a, 114b and tilting the housing 102 towards the vegetation 202. This causes the rotating blade 110 to pivot above or below the cutting plane 156, depending on whether the upper or lower gripping device 112a, 112b, 114a, 114b is disengaged from the vegetation 202. Both continued extension of the blade 110 and manipulation of the aircraft 200 force the blade 110 through the vegetation 202.

These and other advantages of the invention will be further understood and appreciated by those skilled in the art by reference to the following written specification, claims and appended drawings.

Because many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. An airborne vegetation cutting assembly, the assembly comprising:
    a housing defined by a plurality of sidewalls, an upper wall forming an opening, a lower wall, and a cavity, at least one of the sidewalls defined by an upper grappler slot, a lower grappler slot, and a blade slot, the slots disposed in a generally coplanar, spaced-apart relationship;
    a tube defined by a tube aircraft end and a tube housing end, the tube housing end configured to operatively join with the upper wall of the housing, the tube aircraft end configured to operatively join with an aircraft, whereby the aircraft supports the housing during flight;
    at least one upper grappling device configured to extend from and retract into the housing through the upper grappler slot, the at least one upper grappling device configured to articulate between a grappling position and a release position;
    at least one lower grappling device configured to extend from and retract into the housing through the lower grappler slot, the at least one lower grappling device configured to articulate between the grappling position and the release position;
    a rotating blade configured to extend from and retract into the housing through the blade slot, the rotating blade disposed in a generally coplanar relationship with the at least one upper grappling device and the at least one lower grappling device, the rotating blade further configured to rotate along a cutting plane;
    a knuckle disposed between the sidewall of the housing and the tube, the knuckle configured to detachably attach the plurality of sidewalls of the housing and the tube housing end of the tube, the knuckle further configured to rotate and pivot,
    whereby rotation and pivoting by the knuckle enables adjustable orientation of the cutting plane; and
    a hydraulic mechanism, the hydraulic mechanism configured to controllably actuate the at least one upper grappling device, or the at least one lower grappling device, or both between the grappling position and the release position,
    whereby the at least one upper grappling device and the at least one lower grappling device are configured to grapple and release independently of each other,
    the hydraulic mechanism further configured to controllably actuate retraction and extension of the rotating blade,
    the hydraulic mechanism further configured to controllably actuate rotation of the rotating blade,
    the hydraulic mechanism further configured to controllably actuate rotation of the knuckle for rotational control of the housing,
    the hydraulic mechanism further configured to controllably actuate pivoting of the knuckle for pivotal control of the housing.

2. The assembly of claim 1, wherein the tube is generally elongated and cylindrical.

3. The assembly of claim 1, wherein the at least one upper grappling device and the at least one lower grappling device comprise a pair of curved arms.

4. The assembly of claim 1, wherein the at least one lower grappling device is generally the same size as the at least one upper grappling device.

5. The assembly of claim 1, wherein the at least one upper grappling device comprises two coplanar, spaced-apart upper grappling devices.

6. The assembly of claim 1, wherein the assembly further comprises an upper piston configured to displace the at least one upper grappling device between the grappling position and the release position.

7. The assembly of claim 1, wherein the assembly further comprises a lower piston configured to displace the at least one lower grappling device between the grappling position and the release position.

8. The assembly of claim 1, wherein the rotating blade is generally elongated.

9. The assembly of claim 1, wherein the rotating blade comprises serrated edges.

10. The assembly of claim 1, wherein the hydraulic mechanism comprises at least one of the following: a hydraulic pump, a hydraulic fluid reservoir, and a hydraulic controller.

11. The assembly of claim 1, further comprising a power portion operable in the cavity of the housing.

12. The assembly of claim 11, wherein the power portion comprises at least one of the following: an engine, a battery, a fuel tank, a radio controller, and a light emitting diode.

13. The assembly of claim 1, further comprising a rotator configured to enable rotation of the knuckle.

14. The assembly of claim 13, wherein the rotator is configured to rotate up to 360 degrees.

15. The assembly of claim 1, wherein the at least one upper grappling device and the at least one lower grappling device are configured to grapple a vegetation.

16. The assembly of claim 15, wherein the rotating blade is configured to cut a cross section of the vegetation.

17. A vegetation cutting assembly, the assembly comprising:
- a housing defined by a plurality of sidewalls, an upper wall forming an opening, a lower wall, and a cavity, at least one of the sidewalls defined by an upper grappler slot, a lower grappler slot, and a blade slot, the slots disposed in a generally coplanar, spaced-apart relationship;
- a tube defined by a tube aircraft end and a tube housing end, the tube housing end configured to operatively join with the upper wall of the housing, the tube configured to carry wiring, or hydraulic fluid, or both;
- at least one upper grappling device configured to extend from and retract into the housing through the upper grappler slot, the at least one upper grappling device configured to articulate between a grappling position and a release position;
- at least one lower grappling device configured to extend through the lower grappler slot, the at least one lower grappling device configured to articulate between the grappling position and the release position;
- a rotating blade configured to extend from and retract into the housing through the blade slot, the rotating blade disposed in a generally coplanar relationship with the at least one upper grappling device and the at least one lower grappling device, the rotating blade further configured to rotate along a cutting plane;
- a knuckle disposed between the sidewall of the housing and the tube, the knuckle configured to detachably attach the plurality of sidewalls of the housing and the tube housing end of the tube, the knuckle further configured to rotate and pivot,
- whereby rotation and pivoting by the knuckle enables adjustable orientation of the cutting plane;
- a hydraulic mechanism operatively connected to the wiring, the hydraulic fluid, or both, the hydraulic mechanism comprising at least one of the following: a hydraulic pump, a hydraulic fluid reservoir, and a hydraulic controller,
- the hydraulic mechanism configured to controllably actuate the at least one upper grappling device, or the at least one lower grappling device, or both between the grappling position and the release position,
- whereby the at least one upper grappling device and the at least one lower grappling device are configured to grapple and release independently of each other,
- the hydraulic mechanism further configured to controllably actuate retraction and extension of the rotating blade,
- the hydraulic mechanism further configured to controllably actuate rotation of the rotating blade,
- the hydraulic mechanism further configured to controllably actuate rotation of the knuckle for rotational control of the housing,
- the hydraulic mechanism further configured to controllably actuate pivoting of the knuckle for pivotal control of the housing; and
- a power portion operable in the cavity of the housing, the power portion comprises at least one of the following: an engine, a battery, a fuel tank, and a light emitting diode.

18. The assembly of claim 17, wherein the assembly further comprises an upper piston configured to displace the at least one upper grappling device between the grappling position and the release position, and a lower piston configured to displace the at least one lower grappling device between the grappling position and the release position.

19. The assembly of claim 17, wherein the opening in the upper wall of the housing enables communication between the wiring and the hydraulic fluid, the hydraulic mechanism, and the power portion.

20. An airborne vegetation cutting assembly, the assembly comprising:
- an aircraft;
- a housing defined by a plurality of sidewalls, an upper wall forming an opening, a lower wall, and a cavity, at least one of the sidewalls defined by an upper grappler slot, a lower grappler slot, and a blade slot, the slots disposed in a generally coplanar, spaced-apart relationship;
- a tube defined by a tube aircraft end and a tube housing end, the tube housing end configured to operatively join with the upper wall of the housing, the tube aircraft end configured to operatively join with the aircraft, whereby the aircraft supports the housing during flight, the tube configured to carry wiring, or hydraulic fluid, or both;
- at least one upper grappling device configured to extend from and retract into the housing through the upper grappler slot, the at least one upper grappling device configured to articulate between a grappling position and a release position;
- an upper piston configured to displace the at least one upper grappling device between the grappling position and the release position;
- at least one lower grappling device configured to extend from and retract into the housing through the lower grappler slot, the at least one lower grappling device configured to articulate between the grappling position and the release position;
- a lower piston configured to displace the at least one lower grappling device between the grappling position and the release position;
- a rotating blade configured to extend from and retract into the housing through the blade slot, the rotating blade disposed in a generally coplanar relationship with the at least one upper grappling device and the at least one lower grappling device, the rotating blade further configured to rotate along a cutting plane;
- a blade motor configured to power the rotating blade;
- a knuckle disposed between the sidewall of the housing and the tube, the knuckle configured to detachably attach the plurality of sidewalls of the housing and the tube housing end of the tube;
- a rotator configured to enable rotation and pivoting by the knuckle,
- whereby the knuckle pivots and rotates up to 360 degrees,
- whereby rotation and pivoting by the knuckle enables adjustable orientation of the cutting plane;
- a hydraulic mechanism operatively connected to the wiring, the hydraulic fluid, or both, the hydraulic mechanism comprising at least one of the following: a hydraulic pump, a hydraulic fluid reservoir, and a hydraulic controller, the hydraulic mechanism configured to controllably actuate the at least one upper grappling device, or the at least one lower grappling device, or both between the grappling position and the release position, whereby the at least one upper grappling device and the at least one lower grappling device are configured to grapple and release independently of each other, the hydraulic mechanism further configured to controllably actuate retraction and extension of the rotating blade, the hydraulic mechanism further configured to controllably actuate rotation of the rotating blade, the hydraulic mechanism further configured to controllably actuate rotation of the knuckle up to 360 degrees for rotational control of the housing, the hydraulic mechanism further configured to controllably actuate pivoting of the knuckle for pivotal control of the housing; and a power portion operable in the cavity of the housing, the power portion comprises at least one of the following: an engine, a battery, a fuel tank, and a light emitting diode.

* * * * *